Sept. 8, 1964 E. M. DAVIS, JR 3,148,274
BINARY ADDER
Filed July 27, 1961
FIG. 1
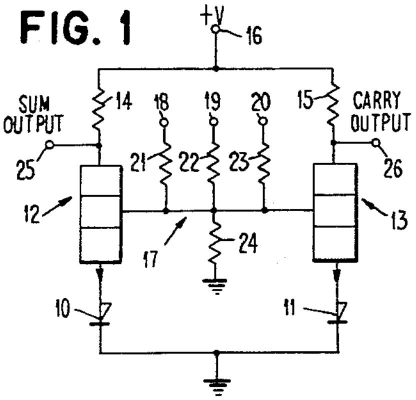
FIG. 3
| LOAD | BINARY | BINARY OUTPUTS | |
|---|---|---|---|
| LINE | INPUTS | SUM | CARRY |
| 0 | 0 0 0 | 0 | 0 |
| 1 | 0 0 1 | 1 | 0 |
| 2 | 0 1 1 | 0 | 1 |
| 3 | 1 1 1 | 1 | 1 |
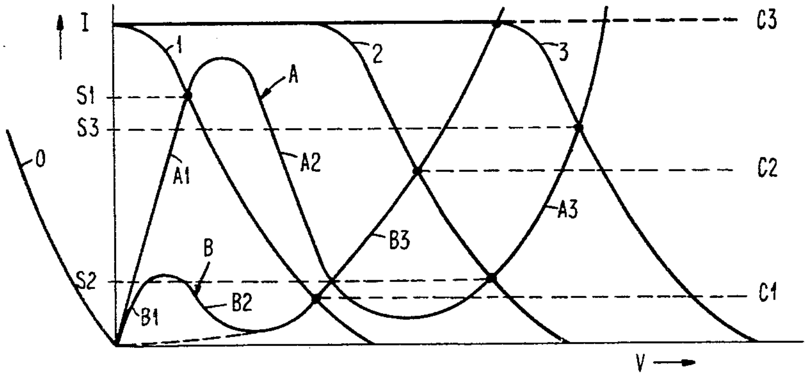
FIG. 2
FIG. 5, FIG. 4
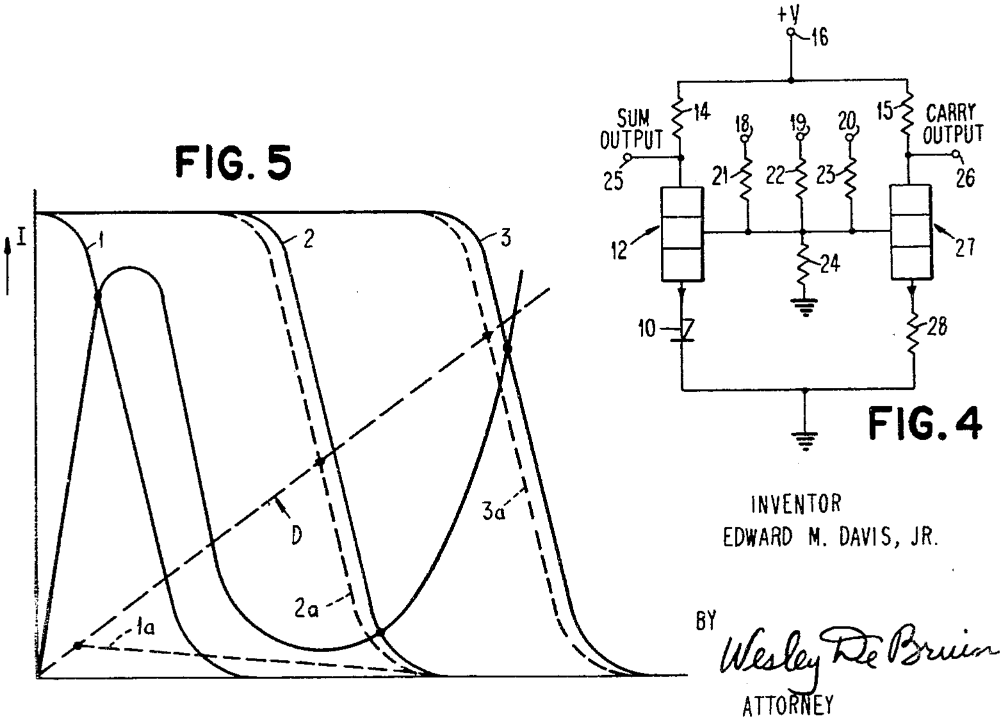
INVENTOR
EDWARD M. DAVIS, JR.
BY Wesley De Bruin
ATTORNEY

United States Patent Office 3,148,274

Patented Sept. 8, 1964

3,148,274

BINARY ADDER

Edward M. Davis, Jr., Poughkeepsie, N.Y., assignor to International Business Machines Corporation, New York, N.Y., a corporation of New York Filed July 27, 1961, Ser. No. 127,239
11 Claims. (Cl. 235—172)

This invention relates to logic circuits and, more particularly, to circuits employing devices having a negative resistance characteristic in conjunction with conventional switching elements for performing complex logic operations.

In the development of modern digital computers efforts are being concentrated on obtaining greater machine versatility at lower cost. Since computer versatility is controlled to a large extent by the speed capabilities of a machine's circuits, as well as the number of components employed, developmental endeavors are being directed to the acquisition of simplified circuits operating at increased speeds (of the order of two nanoseconds, i.e., $2\times10^{-9}$ seconds). This factor is particularly true in the case of circuits which perform the more time consuming and complex logical operations, such as binary addition. As a result, simplification of these circuits is of primary concern if the versatility of such machines is to be increased.

Circuits for performing the complex logical operations are ordinarily obtained from specific arrangements of the basic logic blocks. In most instances, these blocks employ solid state components, including transistors and semiconductor diodes. As is well known in the art, the transistor, when used as a switch (as is the case in logic circuitry), is inherently limited in its switching speed. Consequently, arrangements incorporating these logic blocks for performing the complex logic operations have proved to be unsatisfactory in computing machines since they fail to meet the required switching speeds.

Attempts to reduce the inherent operating delays of the transistors utilized in the basic logic blocks have been directed toward modification of the internal make-up of the component itself, and other efforts have been devoted to modifying the external circuity of the component to prevent or compensate for any delays. Illustrative of the work performed in the latter area are the circuits of pending application Serial No. 835,943, filed August 25, 1959, in the name of Fred K. Buelow and now Patent No. 3,054,911, and the switching circuits of pending application Serial No. 103,374, filed April 17, 1961, in the names of A. J. Gruodis et al., both applications being assigned to the same assignee as the assignee of this invention.

This invention is also in the latter area, enabling currently available semiconductor devices to be utilized in new circuitry for performing complex logic operations at speeds heretofore not attainable.

Accordingly, it is a primary object of the invention to provide a simplified circuit arrangement incorporating a minimum number of active components and employing negative resistance means for accomplishing complex logic operations with minimum stages of delay.

It is another object of the invention to provide a binary adder employing semiconductor devices operable in either a saturating or non-saturating mode and, in a manner, such that the effects of component tolerances are minimal.

A further object is to provide such a circuit for performing the exclusive OR function or parity checking.

Still a further object of the invention is to provide logic circuits employing negative resistance means at signal levels compatible with conventional NOR circuits.

In accordance with the foregoing objects, the invention utilizes the unique characteristics of a negative resistance device, such as the tunnel diode. The tunnel diode has a high state of conduction and a low state of conduction as opposed to conventional switching elements which have only a single state of conduction. The invention employs this device to control the flow of current through conventional switching elements.

Briefly, the invention is embodied in circuitry having first and second current paths. The first path includes a device with a generally N-shaped voltage-ampere characteristic and a negative resistance attribute in the forward conducting direction, and means connected in cascade and in like polarity with this device for establishing a monostable load line. The second current path parallels the first path and includes conducting means having a volt-ampere characteristic with a high current region lying within the valley of the N-shaped characteristic and means for establishing a load line for these conducting means. When employed as a binary adder, means are provided for applying to each of the paths an input signal variable according to whether 0, 1, 2 or 3 input levels are to be added. First and second output means are coupled to the first and second paths respectively. A first output signal is provided only when the first path is in a high current region of its characteristic in response to the application of 1 or 3 input levels, and the second output signal is provided only when the second path is in a high current region of its characteristic in response to the application of the 2 or 3 input levels.

The foregoing and other objects, features and advantages of the invention will be apparent from the following more particular description of preferred embodiments of the invention as illustrated in the accompanying drawing wherein:

FIG. 1 is a circuit diagram of a binary adder according to the principles of the invention;

FIG. 2 is a diagram of the characteristic curves of the binary adder of FIG. 1;

FIG. 3 shows in tabular form the truth table for a binary adder;

FIG. 4 is a second embodiment of the circuit of the invention; and,

FIG. 5 is a diagram of the characteristic curves of the binary adder of FIG. 4.

Referring now to FIG. 1, one form of binary adder comprises a pair of parallel current paths, each including a tunnel diode 10–11. Each diode is connected at its anode electrode to the emitter electrode of a transistor 12–13, respectively, and at its cathode electrode, in common to a reference potential, such as ground. Each of the current paths also includes a load resistor 14–15 connected to the collector electrode of the transistors 12–13, respectively, and to a terminal 16 having a positive voltage source (not shown) connected thereto.

An input network generally designated as 17 is connected to the base electrode of each of the transistors 12–13 for supplying a variable input signal to each of the current paths. Input signals are applied at the terminals 18, 19 and 20, and are coupled through the resistors 21, 22 and 23, respectively, to the two current paths. These resistors, along with resistor 24, which has a resistance value substantially less than that of each of the resistors 21–23, constitute a summing network for the purpose of providing an input signal (appearing as a voltage drop across the resistor 24) representative of the approximate sum of any input voltages which may be applied to the input terminals. The signals applied to this network are in binary form, i.e., they are expressed as either a binary ONE or a binary ZERO, indicative of a signal amplitude level that is either up or down. It will be understood, of course, that any other suitable summing network may be substituted for that employed here; the network described has been chosen merely by way of example and, hence, it does not constitute a limitation of the scope of the invention.

Each of the current paths includes an output circuit connected at the collector electrode of the respective transistors. The output circuit 25 connected to the collector electrode of the transisor 12 is referred to as the sum output of the variable input signal and the output 26 connected to the collector electrode of the transistor 13, is referred to as the carry output.

As previously mentioned, each of the current paths includes a tunnel diode 10–11 which is a heavily doped junction diode capable of switching operation at speeds in the nanosecond range. Each of the diodes has a volt-ampere characteristic with two stable operating regions bounding a negative resistance region. Such a device has been described in greater detail in an article by Leo Esaki appearing in the Physical Review for January 15, 1958, entitled "New Phenomenon in Narrow Germanium PN Junctions."

As shown in FIG. 2, the diodes have volt-ampere characteristics as shown by the curves A and B, respectively. Each curve has two positive resistance regions A1 and A3, and B1 and B3, bounding a negative resistance region A2 and B2, respectively. The respective diodes 10–11 are chosen to have substantially different characteristics, such that the diode 11, as shown by its characteristic curve B, has a high current region lying within the valley of the N-shaped characteristic A for the diode 10. Additionally, the point of maximum peak current for the curve B is substantially lower in magnitude than that of the curve A. The reasons for the differences in the characteristics for the two devices will be more apparent from the explanation which follows hereinafter, in connection with a description of the operation of the circuit.

Each characteristic curve is determined by the combined characteristics of the diode in series with its respective transistor. In order to obtain the curve A, the diode may be fabricated with a material such as gallium arsenide and its associated transistor may be of the germanium type. Similarly, the transistor 13 may also be of the germanium type, but its associated diode 11 is fabricated with germanium. By so fabricating the devices, it is readily apparent that the gallium arsenide diode 10 has twice the voltage swing of the germanium diode 11.

As shown in FIG. 2, the load lines for these characteristic curves are monostable and are determined by the combined effect of the input summing network and the respective transistors so that, dependent upon the number of input levels supplied to the circuit, a load line designated as 0, 1, 2 or 3 is provided. Each additional input will switch the load line to the right an amount equivalent to the difference between any two of the load lines shown. By employing the resistive input summing network in conjunction with the conductivity characteristics of the transistor for obtaining an operating load line for each diode, it is obvious that the component tolerance problems ordinarily encountered in using tunnel diodes with purely resistive loads are greatly reduced.

In operation and with reference to FIG. 2, it is readily apparent that, if no input signals are applied to the circuit, there will be neither a sum nor a carry signal provided at the circuits 25–26. However, when a single input signal is applied to one of the terminals 18–20, current flows from terminal 16 through the transistors 12–13 and diodes 10–11 to the ground reference potential. Numeral 1 indicates the operating load line under such conditions, so that the diode 10 operates in the positive resistance region designated A1, i.e., it is at the high current-low-voltage position S1 on its characteristic curve. The output signal provided at the terminal 25 is in a high current state and, therefore, indicative of a sum or, as expressed in binary form, a ONE. Similarly, the diode 11 operates in the low current position designated C1 and the output signal at terminal 26 is such as to indicate the absence of a carry or, as expressed in binary form, a ZERO.

When input signals are applied to two of the terminals 18–20, the load line for the parallel current paths is that indicated by the numeral 2. As shown for the curves A and B, the diode 10 is in a low current-high-voltage state (point S2), and, therefore, there is no sum produced at the output circuit 25, whereas, the diode 11 is in a relatively high current condition (point C2) and a binary ONE output is provided at the output circuit 26 indicating a carry. In like manner, when all three inputs are applied to the network 17, the load line is indicated by the numeral 3 and both carry and sum output signals are provided at the respective output circuits 25–26.

From the foregoing description, it is obvious that the operation of the circuit of FIG. 1 follows the truth table (refer to FIG. 3) for a binary adder. When there are no inputs to the circuit, there is neither a sum nor a carry output. When there is a single input to the circuit, a sum output is provided and a carry output is absent. When two inputs are applied to the circuit, there is no sum output but there is a carry output. Similarly, when three inputs are applied to the circuit, there is both a sum and a carry.

It should be noted that the circuit of FIG. 1 does not employ the bistable current nature or negative resistance characteristic of the diode 11. Thus, it is possible to employ a conventional germanium diode in series with the transistor 13 to generate the carry output signal at terminal 26, since the germanium diode has a high current region lying within the valley of the N-shaped characteristic of the diode 10. The low current-low voltage portion of the characteristic for a conventional diode is shown by the dashed line of FIG. 2.

Since the negative resistance characteristic of the diode 11 is not employed to generate the carry output signal at terminal 26, an alternate arrangement may be employed for this portion of the circuit, which substantially simplifies the circuit by reducing to three the number of active components necessary to perform the addition. As shown in FIG. 4 wherein like reference characters refer to the same elements, the current path including the diode 10, the transistor 12 and resistor 14 for generating a sum output signal at 25 is the same as that described for the embodiment of FIG. 1. In like manner, the input network is the same as that of FIG. 1. However, the diode 11 and the transistor 13 of the second path are replaced by a transistor 27 which does not begin to conduct until the input voltage reaches a predetermined level. The load lines 1*a*, 1*b* and 1*c* for such a device, when employed in series with a resistor 28, are shown in FIG. 5 in conjunction with the N-shaped characteristic of the first current path. Thus, the volt-ampere characteristic D obtained by this combination is roughly equivalent to that of the germanium transistor 13 and the germanium diode 11 of FIG. 1. A device having this type of conductivity characteristic is a silicon transistor.

It is readily apparent from FIG. 5 that the second path comprising the silicon transistor 27 and the resistor 28 is in a high current region of its volt-ampere characteristic and lying within the valley of the N-shaped characteristic of the first path when either two or three inputs are applied to the circuit. Therefore, under such circumstances, a carry output is provided at the circuit 26. However, when only one input signal is applied to the circuit, the conduction through the silicon transistor 27 is minimal, if at all, and therefore there is no output produced at the circuit 26. The value of the resistor 28 is extremely small and, therefore, it may be equated to the internal resistance of the transistor 27.

Having described the circuits of the invention, it is obvious that a full binary addition is accomplished with a minimum number of components as compared with those circuits previously known in the art. Moreover, the circuits are fully compatible with conventional NOR logic circuits employing the same levels of voltage and providing fan-in and fan-out to other circuits. This is achieved since the transistors employed in these circuits provide impedance matching, power gain and superior load line characteristics permitting one full adder to drive a number of others. Additionally, the circuits operate in a much faster manner (in the order of two nanoseconds), since they are limited only by the operating time of the tunnel diodes which are employed and the switching time of the common emitter transistors.

While the invention has been particularly shown and described with reference to preferred embodiments thereof, it will be understood by those skilled in the art that various changes in form and details may be made therein without departing from the spirit and scope of the invention. For example, the exclusive OR function or the checking of parity may be accomplished if the first current path comprising the diode 10 and transistor 12 are utilized with two branches of the summing network 17.

What is claimed is:

1. A logic circuit, comprising a first current path including a transistor and a device with a negative resistance attribute in the forward conducting region, said transistor and device having together a generally N-shaped volt-ampere characteristic, a second current path including a transistor paralleling said first current path and having a volt-ampere characteristic with a high current region lying within the valley of said N-shaped characteristic, input means for applying to said paths an input signal variable according to whether 0, 1, 2 or 3 ways of a three way input possess a signal, first means coupled to said first path for deriving a first output signal from said circuit only when said first path is operating in a high current region of its characteristic in response to a signal at 1 or 3 of said ways, and a second means coupled to said second path for deriving a second output signal from said circuit only when said second path is in a high current region of its characteristic in response to a signal at 2 or 3 of said ways.

2. The circuit of claim 1, wherein the transistor of the second path is formed of silicon, the transistor of the first path is formed of germanium and the device is formed of gallium arsenide.

3. The circuit of claim 1, wherein said second current path includes a unidirectional conducting device connected with the transistor of this path, the characteristics of said transistor and device of the second current path being such as to provide a volt-ampere characteristic whose high current region lies within the valley of said N-shaped characteristic.

4. The circuit of claim 3, wherein the transistor and device of the second path are formed of germanium.

5. The circuit of claim 4, wherein said unidirectional conducting device has a negative resistance region between first and second positive resistance regions, the second of said positive regions providing the high current region within the valley of said N-shaped characteristic and the first positive region having a peak on said volt-ampere characteristic lower in magnitude than that of said N-shaped characteristic.

6. A binary adder for adding a three way input signal, each way of which is expressed in binary notation as a ONE or ZERO and indicated by a first or second signal amplitude level, respectively, to produce sum and carry output signals according to the number of said input signals having said first or second amplitude level, comprising a first current path including a transistor and a tunnel diode having together a generally N-shaped volt-ampere characteristic, a second current path including a transistor paralleling said first current path and having a volt-ampere characteristic with a high current region lying within the valley of said N-shaped characteristic, input means for applying a variable input signal to said transistors according to the number of said ways expressed as a binary ONE or ZERO, first output means coupled to said first path for deriving a sum output signal from said circuit only when said tunnel diode is in a high current region of its characteristic in response to one or three of said input signals having said first amplitude level, and a second output means coupled to said second path for deriving a carry output signal only when said second path is in a high current region of its characteristic in response to two or three of said input signals having said first amplitude level.

7. The adder of claim 6, wherein the transistor of the second path is formed of silicon and the transistor of the first path is formed of germanium.

8. The adder of claim 6, wherein said second current path includes a unidirectional conducting device connected to the transistor of this path, the characteristics of said transistor and said device being such as to provide a volt-ampere characteristic whose high current region lies within the valley of said N-shaped characteristic.

9. The adder of claim 8, wherein the device and transistor of the second current path are formed of germanium.

10. The adder of claim 8, wherein said unidirectional conducting device has a negative resistance region between first and second positive resistance regions, the second of said positive regions providing the high current region within the valley of said N-shaped characteristic.

11. A binary adder for accepting a three-way input signal and providing a sum output and a carry output, comprising a first current path including a device having an N-shaped volt-ampere characteristic with a negative resistance attribute in the forward conducting region and means connected in like polarity with said device for establishing a load line for monostable operation of said device, a second current path including conducting means having a volt-ampere characteristic with a high current region lying within the valley of the N-shaped characteristic and means for establishing a load line for monostable operation of the conducting means of the second path, means for providing a variable input signal to each of said paths, said input signal varying according to the number of said ways having a signal, so that as said input signal varies the region of circuit operation in each of said paths varies, and means for deriving a sum output and a carry output from the first and second paths respectively, said sum output being provided when said device is in a high current region of its characteristic in response to a signal at one or three of said ways and said carry output being provided when said second path is in the high current region of its characteristics in response to a signal at two or three of said ways.

References Cited in the file of this patent

UNITED STATES PATENTS

| | | |
|---|---|---|
| 2,829,999 | Gudmundsen | Apr. 8, 1958 |
| 3,014,663 | Horton et al. | Dec. 26, 1961 |